US012152744B2

(12) United States Patent
Giraud

(10) Patent No.: US 12,152,744 B2
(45) Date of Patent: Nov. 26, 2024

(54) MOTOR VEHICLE HEADLAMP WITH MULTIPLE LIGHTING MODULES ON AN INCLINED COMMON PLATE

(71) Applicant: VALEO VISION, Bobigny (FR)

(72) Inventor: Sylvain Giraud, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/257,125

(22) PCT Filed: Dec. 17, 2021

(86) PCT No.: PCT/EP2021/086671

§ 371 (c)(1),
(2) Date: Jun. 13, 2023

(87) PCT Pub. No.: WO2022/129625

PCT Pub. Date: Jun. 23, 2022

(65) Prior Publication Data

US 2024/0102621 A1 Mar. 28, 2024

(30) Foreign Application Priority Data

Dec. 18, 2020 (FR) ....................................... 2013720

(51) Int. Cl.
*F21S 41/365* (2018.01)
*F21S 2/00* (2016.01)
(Continued)

(52) U.S. Cl.
CPC ............. *F21S 2/005* (2013.01); *F21S 41/147* (2018.01); *F21S 41/285* (2018.01);
(Continued)

(58) Field of Classification Search
CPC ........ F21S 2/005; F21S 41/365; F21S 41/147; F21S 41/321; F21S 41/285; F21S 41/25;
(Continued)

(56) References Cited

U.S. PATENT DOCUMENTS 7,543,964 B2 * 6/2009 Albou .................. F21S 41/321 362/516
7,918,595 B2 * 4/2011 Albou ..................... F21S 41/43 362/545
(Continued)

FOREIGN PATENT DOCUMENTS

CN 210035349 U 2/2020
EP 1843085 A1 10/2007
(Continued)

OTHER PUBLICATIONS

European Patent Office, International Search Report (with English translation) and Written Opinion of corresponding International Patent Application No. PCT/EP2021/086671, dated Mar. 22, 2023.
(Continued)

*Primary Examiner* — Zheng Song
(74) *Attorney, Agent, or Firm* — Valeo Vision

(57) ABSTRACT

A lighting device for a motor vehicle, including a first lighting module with a first lighting engine able to produce a first light beam with cutoff and a first optical device able to project the first light beam, a second lighting module with a second lighting engine able to produce a second light beam, and a second optical device able to project the second light beam, a plate having an inclination with respect to a horizontal plane, about an axis of inclination. The first and second lighting engines being arranged on the plate, with an offset, and the first and second optical devices exhibiting an offset in a vertical direction.

20 Claims, 3 Drawing Sheets

(51) Int. Cl.

| | |
|---|---|
| ***F21S 41/147*** | (2018.01) |
| ***F21S 41/20*** | (2018.01) |
| ***F21S 41/32*** | (2018.01) |
| *F21W 102/155* | (2018.01) |

(52) U.S. Cl.
CPC ........... *F21S 41/321* (2018.01); *F21S 41/365* (2018.01); *F21W 2102/155* (2018.01)

(58) Field of Classification Search
CPC ... F21S 41/26; F21S 41/148; F21W 2102/155
See application file for complete search history.

(56) References Cited

U.S. PATENT DOCUMENTS

| | | | | |
|---|---|---|---|---|
| 7,959,336 | B2 | 6/2011 | Iwasaki | |
| 8,579,486 | B2 | 11/2013 | Tsukamoto | |
| 8,622,597 | B2 * | 1/2014 | Tseng | F21S 41/365 362/523 |
| 8,632,233 | B2 * | 1/2014 | Kawamura | F21S 45/10 362/547 |
| 9,534,755 | B2 | 1/2017 | Blandin et al. | |
| 11,572,997 | B2 * | 2/2023 | Berger | F21S 41/365 |
| 2009/0284980 | A1 * | 11/2009 | Iwasaki | F21S 41/365 362/517 |
| 2010/0321947 | A1 * | 12/2010 | Hamashima | F21S 41/39 362/547 |
| 2011/0205748 | A1 * | 8/2011 | Yatsuda | F21S 41/147 362/338 |
| 2011/0211361 | A1 * | 9/2011 | Kawamura | F21V 29/70 362/516 |
| 2019/0234575 | A1 * | 8/2019 | Laminette | F21S 41/43 |
| 2022/0282845 | A1 * | 9/2022 | Colombel | B60Q 1/076 |

FOREIGN PATENT DOCUMENTS

| | | | | | |
|---|---|---|---|---|---|
| EP | 2009346 | A1 | | 12/2008 | |
| EP | 2386793 | A1 | | 11/2011 | |
| EP | 02492580 | A | | 8/2012 | |
| EP | 3285001 | A1 | | 2/2018 | |
| FR | 2979971 | A1 | | 3/2013 | |
| JP | 2008171723 | | * | 7/2008 | F21V 17/00 |
| JP | 2008171723 | A | * | 7/2008 | |
| JP | 2009277482 | A | | 11/2009 | |
| JP | 2010080082 | A | | 4/2010 | |
| JP | 2011082117 | A | | 4/2011 | |
| JP | 2018174091 | A | | 11/2018 | |
| WO | 2020025171 | A1 | | 2/2020 | |

OTHER PUBLICATIONS

Japan Patent Office, Search Report (with English translation) of corresponding Japanese Patent Application No. 2023-537043, dated Jun. 28, 2024.

Japan Patent Office, Office Action (with English translation) of corresponding Japanese Patent Application No. 2023-537043, dated Jun. 28, 2024.

* cited by examiner

MOTOR VEHICLE HEADLAMP WITH MULTIPLE LIGHTING MODULES ON AN INCLINED COMMON PLATE

TECHNICAL FIELD

The invention relates to the technical field of lighting, notably for motor vehicles.

BACKGROUND OF THE INVENTION

It is generally known practice to produce a cutoff lighting beam by using one or more light-emitting modules with a bender. Such a light-emitting module conventionally comprises a collector with a reflective surface of revolution having an elliptical profile, in the form of a cap in a half-space delimited by a horizontal plane. An essentially point light source, of light-emitting diode type, is located at a first focal point of the reflective surface and shines into the half-space in the direction of said surface. The rays are thus reflected in a convergent manner toward a second focal point of the reflective surface. Another, generally planar, reflective surface with a cutoff edge at the second focal point ensures an upward reflection of the rays which do not pass precisely through the second focal point, these rays then being refracted by a thick lens toward the bottom of the lighting beam. This reflective surface is commonly referred to as a "bender" in that it "bends" toward the top of the projecting lens those rays which would otherwise form an upper portion of the lighting beam. Such a light-emitting module has the drawback of requiring the bender and the cutoff edge to be positioned with a high degree of precision. Also, the projecting lens must be a thick lens because of its small focal length, this increasing its weight and complicating its production, notably as regards sink marks. In addition, the collector has a certain height and, thus, a certain heightwise bulk.

The published patent document WO 2020/025171 A1 discloses a light-emitting module, in particular for a motor vehicle, comprising a collector with a reflective surface collecting and reflecting the light rays emitted by a light source in a light beam, similar to a light-emitting module with a bender. The light-emitting module also comprises a projection optical system, such as a lens, specifically configured to project the light beam in question by forming an image of the reflective surface of the collector. To that end, the optical projection system has a focal point located on the reflective surface, for example at a rear edge thereof, so as to correctly image said edge and form a clear cutoff in the projected light beam. This type of light-emitting module has advantages of compactness, notably in height terms, and production simplicity. In this teaching, this module with a cutoff is combined with other modules to form a headlamp which, in addition to a lighting function with a cutoff that is commonly referred to as low beam, notably performs a lighting function without a cutoff, commonly referred to as high beam. The optical systems may furthermore each comprise one or more mirrors.

It is generally advantageous to combine as many lighting functions as possible in one and the same lighting device, notably for reasons of style. The shape of the body of the vehicle, however, imposes shape constraints, possibly necessitating an offset of the modules in relation to one another. Such an offset, however, is not without difficulties in terms of bulk and/or assembly.

SUMMARY OF THE INVENTION

The object of the invention is to overcome at least one of the drawbacks of the aforementioned prior art. More particularly, the aim of the invention is to propose a lighting device for a motor vehicle that comprises multiple lighting modules and makes it possible to conform to particular body shapes, compactly and economically.

The object of the invention is a lighting device for a motor vehicle, comprising a first lighting module comprising a first light-emitting engine comprising one or more first light sources and a first collector with at least one reflective surface able to reflect light rays emitted by the one or more first light sources in a first light beam with a cutoff, and a first optical device able to project the first light beam along an optical axis of the lighting device; a second lighting module comprising a second light-emitting engine comprising one or more second light sources, a second collector with at least one reflective surface able to reflect light rays emitted by the one or more second light sources in a second light beam, and a second optical device able to project the second light beam along the optical axis of the lighting device; said lighting device being notable in that it comprises a plate having an inclination $\gamma$ in relation to a horizontal plane, about an axis of inclination which is horizontal and perpendicular to the optical axis; the first and second light-emitting engines being disposed on the plate, with an offset along a vertical projection of the optical axis onto the plate, and the first and second optical devices have an offset along a vertical direction, when the lighting device is in the mounting position.

A light-emitting engine is able to generate a light beam. Such a device is also referred to as light engine or light generator.

The offset of the light-emitting engines can be considered in relation to a rear end of their collectors or of their reflective surfaces.

The following features are optional and are disclosed in all technically possible combinations.

According to one advantageous embodiment of the invention, the lighting device moreover comprises a third lighting module comprising a third light-emitting engine comprising one or more third light sources, a third collector with at least one reflective surface able to reflect light rays emitted by the one or more third light sources in a third light beam, and a third optical device able to project the third light beam along the optical axis of the lighting device; the third light-emitting engine being disposed on the plate with an offset along the vertical projection of the optical axis onto the plate so as to form, on said plate, with the first and second lighting modules, a profile with an overall inclination $\beta$ in relation to the axis of inclination.

According to one advantageous embodiment of the invention, the overall inclination $\beta$ of the profile of the first, second and third light-emitting engines lies between 1° and 80°.

According to one advantageous embodiment of the invention, the third optical device has an offset along a vertical direction so as to form, with the first and second optical devices, in a vertical plane, a profile with an overall inclination $\alpha$ in relation to a horizontal direction, when the lighting device is in the mounting position.

According to one advantageous embodiment of the invention, the overall inclination $\alpha$ of the profile of the first, second and third optical devices lies between 1° and 80°.

According to one advantageous embodiment of the invention, the third beam is a lighting beam without a cutoff that forms a lighting function of the high-beam type with the first beam.

According to one advantageous embodiment of the invention, the inclination $\gamma$ of the plate lies between 5° and 90°.

Advantageously, the inclination γ of the plate lies between 5° and 25°, in particular when the first, second and third optical devices are lenses.

According to one advantageous embodiment of the invention, each of the first, second and, where appropriate, third light-emitting engines is disposed at an edge of the plate, each of the first, second and, where appropriate, third collectors projecting beyond said edge, said edge having a stepped profile with a step corresponding to each of said first, second and, where appropriate, third light-emitting engines.

According to one advantageous embodiment of the invention, the profile of the light-emitting engines is parallel to the main axis.

According to one advantageous embodiment of the invention, the profile of the optical devices is parallel to the main axis.

According to one advantageous embodiment of the invention, the second light beam is a beam with a cutoff having a kink that forms a lighting function of the low-beam type with the first beam.

According to one advantageous embodiment of the invention, the first optical device is configured to image a portion of the at least one reflective surface of the first collector that is illuminated by the one or more first light sources, said portion being located behind said one or more first light sources along a main direction of propagation of the light along the optical axis.

According to one advantageous embodiment of the invention, the first collector comprises multiple reflective surfaces which are disposed next to one another and each of which is associated with one of the multiple first light sources, said multiple reflective surfaces having rear edges, along a main direction of propagation of the light, which are adjacent to a straight line on the plate, the first optical device exhibiting a focal line which coincides with said straight line or is located between said straight line and the multiple first light sources, or else is located behind said straight line at a distance less than or equal to 10 mm.

According to one advantageous embodiment of the invention, the first optical device is a mirror having a constant parabolic profile along a horizontal direction, when the lighting device is in the mounting position, so as to exhibit a rectilinear focal line.

According to one advantageous embodiment of the invention, each of the first, second and, where appropriate, third optical devices is configured to vertically deflect, by reflection and/or refraction, the first, second and, where appropriate, third light beams respectively from a direction corresponding to the inclination γ of the plate to a direction parallel to the optical axis.

The measures of the invention are advantageous in that they make it possible to implement multiple regulation lighting functions by incorporating multiple lighting modules that form a profile having an overall inclination in front view and/or an overall inclination in top view, on considering the lighting device mounted on the vehicle, with a compact and simple structure. The use of a shared plate specifically substantially simplifies the construction and the assembly of the lighting device.

DETAILED DESCRIPTION OF THE INVENTION

Figure 1:
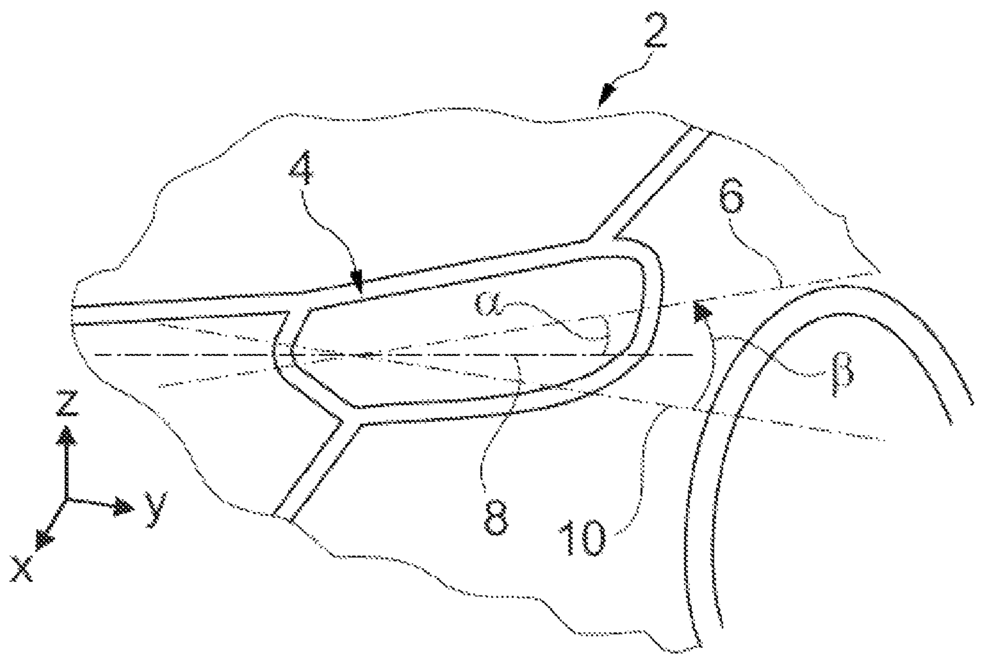
FIG. 1 is a depiction of a motor vehicle front part, illustrating the inclination constraints imposed on the headlamp by the shape of the body of the vehicle.

FIG. 1 shows, in perspective, a vehicle front portion provided with a headlamp corresponding to a lighting device in accordance with the invention.

The axis x corresponds to a longitudinal direction of the vehicle, the axis y to a transverse direction, in the present case horizontal and perpendicular to the longitudinal direction, and the axis z to a vertical direction.

As can be seen, the lighting device 4 is disposed at the front of the vehicle 2, on the left-hand side (in the direction of forward travel of the vehicle), it being understood that a symmetrical lighting device is disposed on the right-hand side of the vehicle. A main axis 6 of the lighting device 4 is shown; it can be seen that this main axis 6 forms a non-zero angle α with a horizontal axis 8 located in a vertical plane containing the main axis 6 in question. The lighting device thus has an inclination α in front view, this inclination in the present case being upward along the lighting device 4 toward the corresponding lateral flank of the vehicle.

Similarly, the main axis 6 forms a non-zero angle β with a transverse axis 10 which is perpendicular to the longitudinal axis of the vehicle and horizontal. The lighting device thus has an inclination β in top view, this inclination in the present case being toward the rear of the vehicle along the lighting device 4 toward the corresponding lateral flank of the vehicle.

The one or more inclinations at the angle α and/or the angle β, which are essentially dictated by the shape of the body of the vehicle, force a particular disposition of the lighting modules that will be described below.

Figure 2:
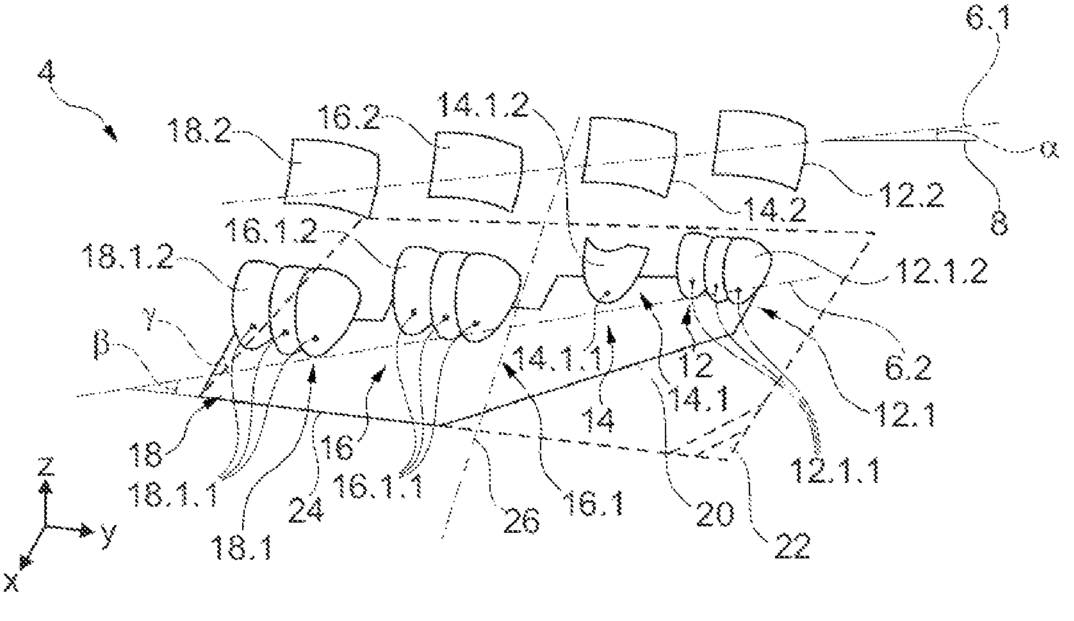
FIG. 2 is a depiction of constituent elements of a lighting device in accordance with the invention.

FIG. 2 illustrates the main elements of the lighting device 4 in FIG. 1. The lighting device 4 comprises multiple lighting modules 12, 14, 16 and 18. Each of these lighting modules comprises a light-emitting engine 12.1, 14.1, 16.1 and 18.1 able to form a light beam, and an optical device 12.2, 14.2, 16.2 and 18.2 able to project the corresponding light beam. By way of example, the first lighting module 12 produces a lighting beam with a wide horizontal cutoff, the second lighting module 14 produces a narrow lighting beam with a cutoff having a kink in the center, supplementing the lighting beam, with a wide horizontal cutoff, of the first lighting module 12 so as to perform a regulation lighting function with a cutoff, commonly referred to as low-beam. Still by way of example, the third lighting module 16 produces a lighting beam without a cutoff, supplementing the lighting beams produced by the first and second lighting modules 12 and 14 so as to form a regulation lighting function without a cutoff, commonly referred to as high-beam. The fourth lighting module 18 produces a lighting beam without a cutoff, supplementing the lighting beams produced by the first and second lighting modules 12 and 14. This lighting beam without a cutoff is advantageously of the matrix type, specifically with a limited transverse extent which is selectable depending on the one or more active light sources.

Each of the light-emitting engines 12.1, 14.1, 16.1 and 18.1 comprises one or more light sources 12.1.1, 14.1.1, 16.1.1 and 18.1.1, and a collector 12.1.2, 14.1.2, 16.1.2 and 18.1.2 provided with one or more reflective surfaces which are advantageously in the form of a cap and are configured to reflect the light rays emitted by the one or more corresponding light sources in a light beam which is then projected by the corresponding optical device 12.2, 14.2, 16.2 and 18.2. Advantageously, a specific light source is associated with each reflective surface. In the present case, each of the first, third and fourth light-emitting engines 12.1, 16.1 and 18.1 comprises three light sources 12.1.1, 16.1.1 and 18.1.1 and three directly adjacent, corresponding reflective surfaces on the collector 12.1.2, 16.1.2 and 18.1.2. The second light-emitting engine 14.1 comprises a single light source 14.1.1 and a single reflective surface on the collector 14.1.2. However, it will be understood that the number of light sources and/or associated reflective surfaces can vary from the example illustrated in FIG. 2.

It can be seen that each of the light-emitting engines 12.1, 14.1, 16.1 and 18.1 is disposed on a plate 20. The latter is then shared by the light-emitting engines in question. It is generally flat and inclined by an angle γ in relation to a horizontal plane 22. This inclination is about an axis of inclination 24 corresponding to the y axis, specifically a transverse direction which is horizontal and perpendicular to the longitudinal direction of the vehicle. The effect of this inclination, in the present case upward from the axis of inclination 24, is that the light beams produced by the light-emitting engines 12.1, 14.1, 16.1 and 18.1 are oriented with a vertical component upward, forcing the optical devices 12.2, 14.2, 16.2 and 18.2 to be offset upward.

The angle of inclination γ of the plate 20 may be greater than or equal to 5°, preferably greater than or equal to 10°, preferably greater than or equal to 15° and/or less than or equal to 90°, preferably less than or equal to 50°, more preferably less than or equal to 40°. The angle of inclination γ may be higher, notably when the optical devices 12.2, 14.2, 16.2 and 18.2 are mirrors. This angle of inclination γ may be smaller, for example less than or equal to 25°, notably when the optical devices 12.2, 14.2, 16.2 and 18.2 are lenses.

Still in FIG. 2, it can be seen that the light-emitting engines 12.1, 14.1, 16.1 and 18.1 are disposed with an offset in relation to one another along the vertical projection 26 of the optical axis of the lighting device onto the plate, such that the corresponding upward offset of the optical devices 12.2, 14.2, 16.2 and 18.2 is all the greater the greater the offset on the plate 20 along the optical projection 26 of the optical axis is. The offset of the light-emitting engines 12.1, 14.1, 16.1 and 18.1 on the plate 20 along the vertical projection 26 of the optical axis can be considered with reference to the distance between each of these light-emitting engines and the axis of inclination 24, this distance being measured perpendicularly to said axis. It will be seen that the fourth light-emitting engine 18.1 is closest to the axis of inclination 24, with the third, second and first light-emitting motors 16.1, 14.1 and 12.1 being gradually further away from the axis of inclination 24. This gradual offset is illustrated by the profile 6.2 of the light-emitting engines 12.1, 14.1, 16.1 and 18.1 on the plate 20, exhibiting the overall inclination in relation to the axis of inclination 24. This overall inclination corresponds to the angle β illustrated in FIG. 1. For reasons of clarity of presentation, the profile 6.2 is shown in the form of a straight line passing over the rear edges (in relation to an overall direction of propagation of the light from the light-emitting engines 12.1, 14.1, 16.1 and 18.1) of the collectors 12.1.1, 14.1.1, 16.1.1 and 18.1.1. It will be understood that the profile 6.2 is not necessarily perfectly rectilinear. However, it forms an overall inclination in relation to the axis of inclination 24 such that the first light-emitting engine 12.1 is more offset than the second light-emitting engine 14.1, the second light-emitting engine 14.1 is more offset than the third light-emitting engine 16.1, and the third light-emitting engine 16.1 is more offset than the fourth light-emitting engine 18.1. In other words, the angle of inclination β of the profile 6.2 is not necessarily constant, but in any event does not change sign along the length.

It should be noted that the inclination β of the profile 6.2 of the light-emitting engines also applies to the profile 6.1 of the optical devices 12.2, 14.2, 16.2 and 18.2.

The angle of inclination β of the profile 6.2 in relation to the axis of inclination 24 may be greater than or equal to 1°, preferably greater than or equal to 5°, more preferably greater than or equal to 10° and/or less than or equal to 80°, preferably less than or equal to 30°, more preferably less than or equal to 20°.

The optical devices 12.2, 14.2, 16.2 and 18.2 of the lighting modules 12, 14, 16 and 18 in the present case are mirrors with a parabolic profile that have a focal point or a focal line located on a rear part of the one or more reflective surfaces. This rear part is located between a rear edge of the one or more reflective surfaces and the one or more corresponding light sources. If the various lighting modules 12, 14, 16 and 18 are considered to have a more or less identical focal length, the offset of the light-emitting engines 12.1, 14.1, 16.1 and 18.1 on the plate 20, combined with the pivoting of the plate 20 about the pivot axis 24, as described above, then causes a vertical offset of the optical devices 12.2, 14.2, 16.2 and 18.2. Specifically, it will be seen that the first optical device 12.2 is more upwardly offset than the second optical device 14.2 is, the second optical device 14.2 is more upwardly offset than the third optical device 16.2 is, and the third optical device 16.2 is more upwardly offset than the fourth optical device 18.2 is. The optical devices then have the profile 6.1 that forms an overall inclination in relation to a horizontal direction 8. This overall inclination corresponds to the angle α illustrated in FIG. 1. It will be understood that the profile 6.1 is not necessarily perfectly rectilinear. However, it forms an overall inclination in relation to the horizontal direction 8. In other words, the angle of inclination α of the profile 6.1 is not necessarily constant, but in any event does not change sign along its length.

The angle of inclination α of the profile 6.1 in relation to the horizontal direction 8 may be greater than or equal to 1° and/or less than or equal to 80°, preferably less than or equal to 15°, more preferably less than or equal to 10°.

It should be noted that the inclination α of the profile 6.1 of the optical devices also applies to the profile 6.2 of the light-emitting engines.

As can be seen, the profiles 6.1 and 6.2 are parallel to the main axis 6.

Figure 3:
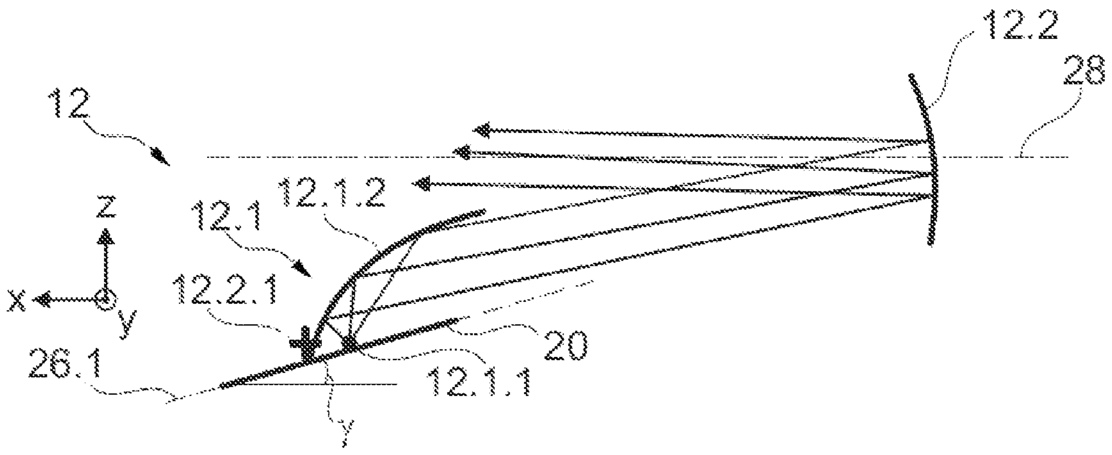
FIG. 3 is a depiction of the operating principle of a lighting module of the lighting device in FIG. 2, according to a first embodiment.
Figure 4:
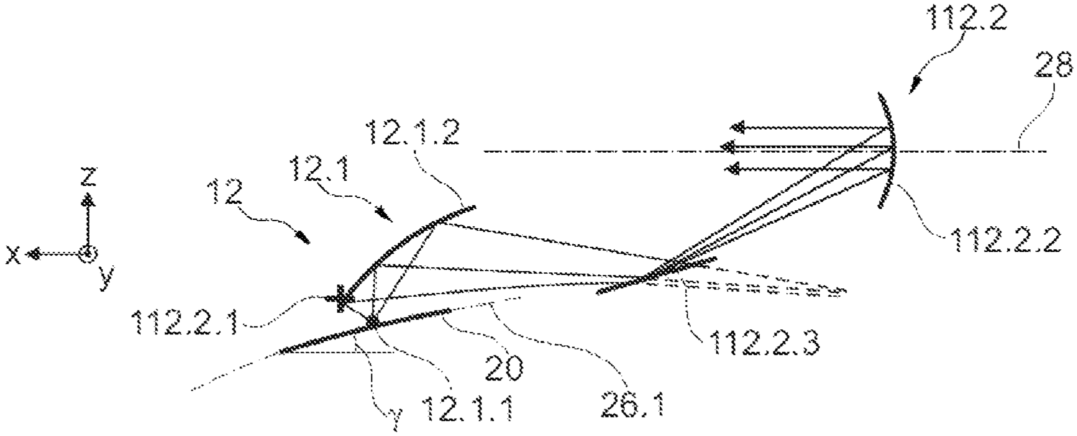
FIG. 4 is a depiction of the operating principle of a lighting module of the lighting device in FIG. 2, according to a second embodiment.
Figure 5:
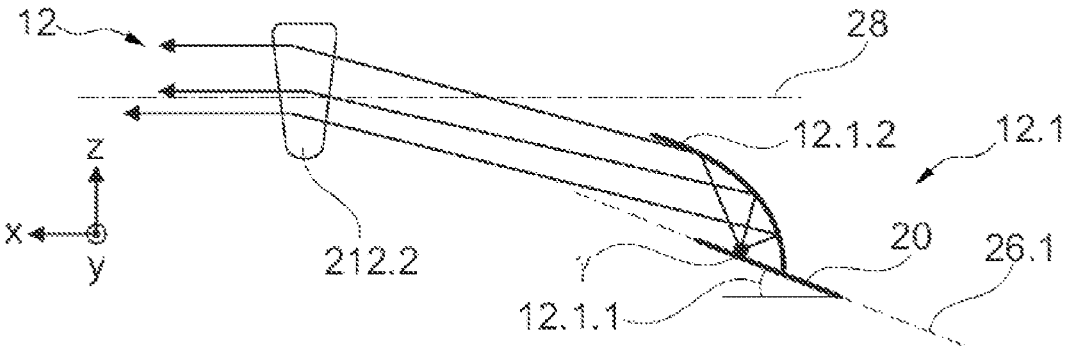
FIG. 5 is a depiction of the operating principle of a lighting module of the lighting device in FIG. 2, according to a third embodiment.

FIGS. 3 to 5 show the operating principle of the lighting modules of the lighting device in FIG. 2, according to various embodiments. Each of these FIGS. is a sectional depiction through the first lighting module 12 of the lighting device 4 in FIG. 2, illustrating the operating principle of said module, it being understood that this depiction and this operating principle can be applied to the other lighting modules.

FIG. 3 is a depiction of the operating principle of the first lighting module 12 of the lighting device 4 in FIG. 2, according to a first embodiment. The optical device 12.2 is a single mirror, in accordance with FIG. 2. The collector 12.1.2 comprises a support in the form of a shell or cap, and a reflective surface on the inner face of the support. The reflective surface advantageously has a profile of the elliptical or parabolic type. It is advantageously a surface of revolution around an axis parallel to the optical axis 26.1 of the light-emitting engine 12.1. Alternatively, it may be a free-form surface or a swept surface or an asymmetric surface. There may also be multiple ones, so as to have several sectors. The collector 12.1.2 in the form of a shell or cap is advantageously made of materials with good resistance to heat, for example glass or synthetic polymers such as polycarbonate PC or polyetherimide PEI. The expression “parabolic type” generally applies to reflectors of which the surface has a single focal point, i.e. one region of convergence of the light rays, such that the light rays emitted by a light source placed in this region of convergence are projected to a great distance after reflection from the surface. “Projected to a great distance” means that these light rays do not converge toward a region located at least at 10 times the dimensions of the reflector. In other words, the reflected rays do not converge toward a region of convergence or, if do they converge, this region of convergence is located at a distance greater than or equal to 10 times the dimensions of the reflector. It is therefore possible for a surface of the parabolic type to have or not to have parabolic portions. A reflector having such a surface is generally used alone to create a light beam. Alternatively, it may be used as projecting surface associated with a reflector of the elliptical type. In this case, the light source of the reflector of the parabolic type is the region of convergence of the rays reflected by the reflector of the elliptical type.

The light source 12.1.1 is disposed at a focal point of the reflective surface such that its rays are collected and reflected along the optical axis 26.1 of the light-emitting engine 12.1. At least some of these reflected rays have angles of inclination in a vertical plane in relation to said axis that are less than or equal to 25°, and preferably less than or equal to 10°, so as to be under what are referred to as Gaussian conditions, making it possible to obtain a stigmatism, that is to say a clearness of the projected image. Advantageously, the rays are those reflected by the rear part of the reflective surface.

The optical device 12.2 is configured to project, along the optical axis 28 of the lighting module 12, the light beam produced by the light-emitting engine 12.1. It comprises a single mirror with a parabolic profile having a focal point 12.2.1 located on a rear part of the reflective surface, this rear part being located between the rear edge of said surface and the light source 12.1.1. In the present case, the focal point 12.2.1 is located on the rear edge of the reflective surface. Such positioning of the focal point makes it possible to image the reflective surface illuminated by the light source 12.1.1, in particular to clearly image the rear edge of the reflective surface and thus to project a light beam with a clear horizontal cutoff.

In the case of the other lighting modules, in particular the third and fourth lighting modules 16 and 18, the focal point could be at the front of the rear edge, on the basis that a horizontal cutoff is not formed.

FIG. 4 is a depiction of the operating principle of the first lighting module 12 of the lighting device 4 in FIG. 2, according to a second embodiment. The reference numbers of FIGS. 2 and 3 are used; however, for the optical device, these numbers are increased by 100. Reference is moreover made to the description of FIG. 3 for identical or corresponding elements. Specific numbers are used to refer to elements specific to this embodiment.

The lighting module 12 in FIG. 4 differs from that in FIG. 3 in that the optical device 112.2 comprises a parabolic mirror 112.2.2 and a redirecting mirror 112.2.3. The redirecting mirror 112.2.3, which is advantageously flat, redirects a virtual image of the illuminated reflective surface toward the parabolic mirror 112.2.2. Such a configuration is advantageous for producing a light beam without a cutoff, such as the third and fourth lighting modules 16 and 18 (FIG. 2). In this case, the focal point 12.2.1 may be at a distance from the rear edge of the reflective surface.

FIG. 5 is a depiction of the operating principle of the first lighting module 12 of the lighting device 4 in FIG. 2, according to a third embodiment. The reference numbers of FIGS. 2 and 3 are used; however, for the optical device, these numbers are increased by 200. Reference is moreover made to the description of FIG. 3 for identical or corresponding elements.

The lighting module 12 in FIG. 5 differs from that in FIG. 3 in that the optical device 212.2 is a lens and no longer a mirror. This means that there is then no more reversal of the overall direction of propagation of the light. It will be seen that the light-emitting engine 12.1 is oriented oppositely so as to provide light in the direction of propagation of the light beam projected by the optical device 212.2.

Figure 6:
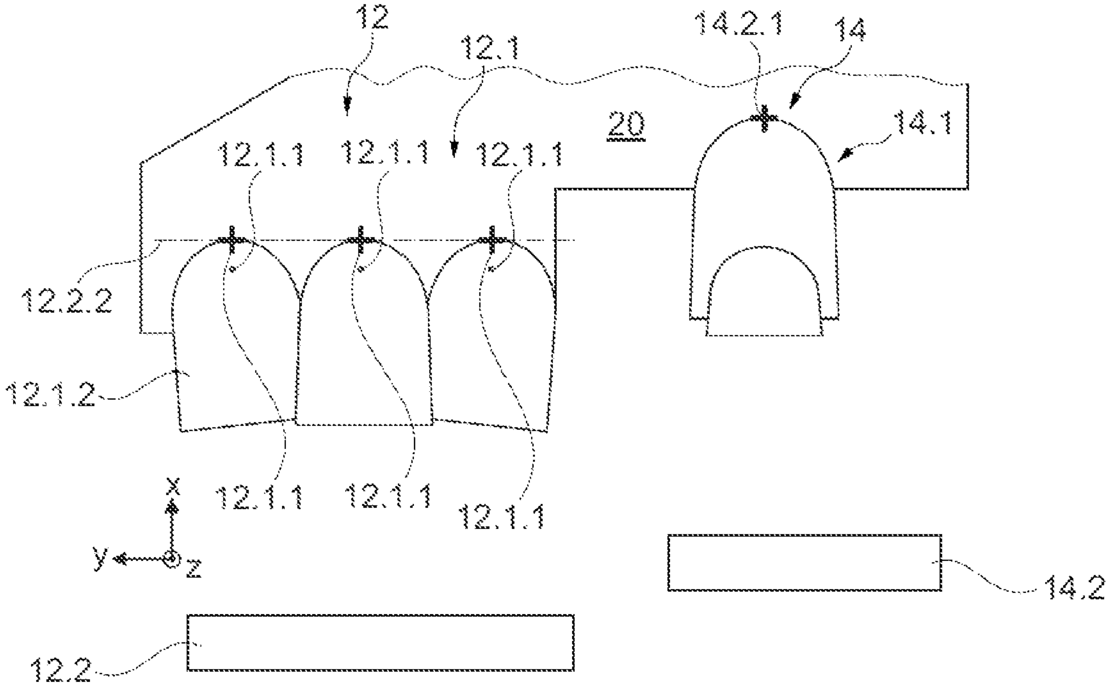
FIG. 6 is a top view of the two lighting modules, with a cutoff, of the lighting device in FIG. 2.

FIG. 6 is a top view of the first and second lighting modules of the lighting device in FIG. 2.

The first lighting module 12 produces a wide light beam with a horizontal cutoff. To that end, the light-emitting engine 12.1 comprises multiple light sources 12.1.1, in the present case three, and the collector 12.1.2 comprises multiple adjacent reflective surfaces, in the present case three. The optical device 12.2 has the particular feature of having a rectilinear focal line 12.1.2 passing through or close to the rear ends of the reflective surfaces, at their rear edges, then forming the focal points 12.1.1. To that end, the optical device 12.2, which in the present case is a parabolic mirror but could notably be a lens, has a section transverse to the y axis which is constant along said axis. This particular feature is advantageous when the projected light beam must have a particularly clear horizontal cutoff. Specifically, if the focal line is slightly curved, in which case the reflective surfaces of the collector 12.2.2 are arranged in relation to one another such that the focal line passes through their rear ends (at their rear edge), the optical device will have a corresponding curvature in an inclined plane corresponding to that of the plate 20, which will then vertically offset the reflected and projected rays, then degrading the horizontal cutoff. In other words, the effect of a curvature of the optical surfaces of the optical device in the inclined plane of the plate 20 is to offset the projected light rays along the axis z, this possibly being undesirable for a lighting function with a horizontal cutoff. Such a curvature, however, makes it possible to spread the projected light beam horizontally, that is to say in the xy plane. For a lighting function with a spread horizontal cutoff, a compromise between a constant section along the y axis and a profile that is curved in the xy plane may be advantageous.

The optical device 14.2 of the second lighting module 14 has a focal point 14.2.1 located at the rear end of the reflective surface of the light-emitting engine 14.1.

Figure 7:
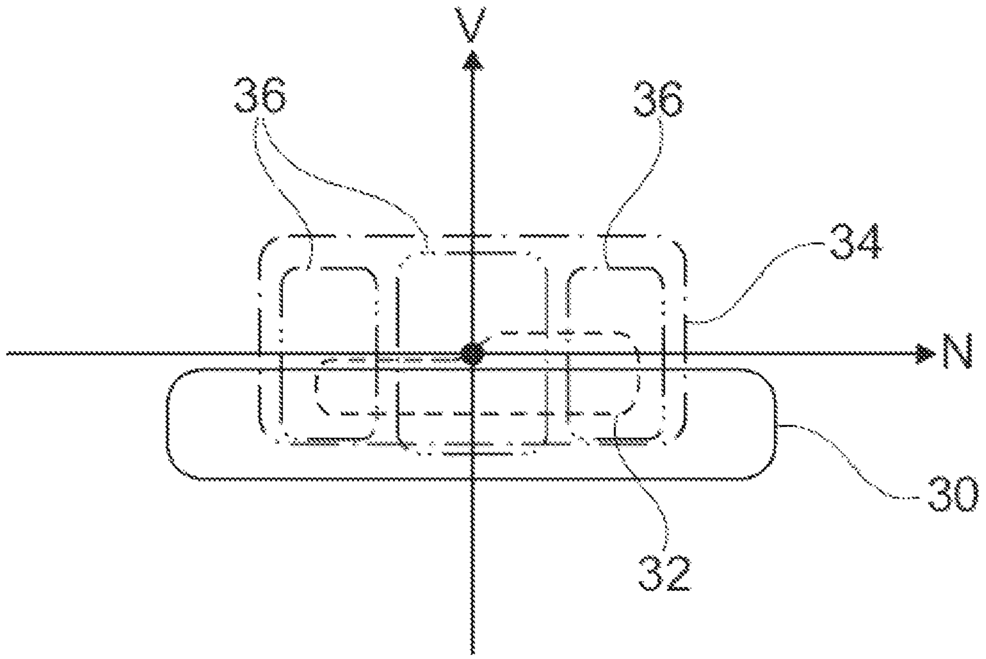
FIG. 7 is a schematic depiction of the luminous images produced by the lighting device in FIG. 2 that correspond to various regulation lighting functions.

FIG. 7 is a schematic depiction of the luminous images produced by the lighting device in FIG. 2 that correspond to various regulation lighting functions. The horizontal axis H and the vertical axis V cross on the optical axis of the lighting device.

The first lighting module 12 produces a horizontally spread luminous image 30 having a clear horizontal cutoff close to the horizontal axis H, so as to form a lighting function of the low-beam type.

The second lighting module 14 produces a luminous image 32 which is horizontally narrow (in relation to the luminous image 30) with a horizontal cutoff forming a kink at the optical axis of the lighting device, supplementing the luminous image 30 of the first lighting module 12 so as to form the lighting function of the low-beam type.

The third lighting module 16 produces a luminous image 34 without a horizontal cutoff, upwardly supplementing the luminous image 30 of the first lighting module 12 so as to form a lighting function of the high-beam type.

The fourth lighting module 18 produces a luminous image 36 without a horizontal cutoff that is segmented, supplementing the luminous image 30 of the first lighting module 12 so as to form a lighting function of the high-beam type in a matrix arrangement with a darker region corresponding to the one or more unilluminated segments.

What is claimed is:

1. A lighting device for a motor vehicle, comprising:

a first lighting module including a first light-emitting engine including one or more first light sources and a first collector with at least one reflective surface able to reflect light rays emitted by the one or more first light sources in a first light beam with a cutoff, and a first optical device able to project the first light beam along an optical axis of the lighting device, with the first optical device being configured to image a portion of the at least one reflective surface of the first collector that is illuminated by the one or more first light sources, the portion being located behind the one or more first light sources along a main direction of the optical axis;

a second lighting module including a second light-emitting engine including one or more second light sources, a second collector with at least one reflective surface able to reflect light rays emitted by the one or more second light sources in a second light beam, and a second optical device able to project the second light beam along the optical axis of the lighting device; and a plate having an inclination γ in relation to a horizontal plane, about an axis of inclination which is horizontal and perpendicular to the optical axis; the first and second light-emitting engines being disposed on the plate, with an offset along a vertical projection of the optical axis onto the plate, and the first and second optical devices have an offset along a vertical direction, when the lighting device is in the mounting position.

2. The lighting device as claimed in claim 1, further comprising a third lighting module including a third light-emitting engine including one or more third light sources, a third collector with at least one reflective surface able to reflect light rays emitted by the one or more third light sources in a third light beam, and a third optical device able to project the third light beam along the optical axis of the lighting device; the third light-emitting engine being disposed on the plate with an offset along the vertical projection of the optical axis so as to form, on the plate, with the first and second lighting modules, a profile with an overall inclination β in relation to the axis of inclination.

3. The lighting device as claimed in claim 2, wherein the third optical device has an offset along a vertical direction so as to form, with the first and second optical devices, in a vertical plane, a profile with an overall inclination α in relation to a horizontal direction, when the lighting device is in the mounting position.

4. The lighting device as claimed in claim 3, wherein the overall inclination α of the profile of the first, second and third optical devices lies between 1° and 80°.

5. The lighting device as claimed in claim 2, wherein the overall inclination β of the profile of the first, second and third light-emitting engines lies between 1° and 80°.

6. The lighting device as claimed in claim 2, wherein the third beam is a lighting beam without a cutoff that forms a lighting function of the high-beam type with the first beam.

7. The lighting device as claimed in claim 2, wherein each of the first, second, and third light-emitting engines is disposed at an edge of the plate, each of the first, second, and third collectors projecting beyond the edge, the edge having a stepped profile with a step corresponding to each of the first, second, and third light-emitting engines.

8. The lighting device as claimed in claim 2, wherein each of the first, second, and third optical devices is configured to vertically deflect, by reflection and/or refraction, the first, second, and third light beams respectively from a direction corresponding to the inclination of the plate to a direction parallel to the optical axis.

9. The lighting device as claimed in claim 1, wherein the inclination γ of the plate lies between 5° and 90°.

10. The lighting device as claimed in claim 1, wherein the second light beam is a beam with a cutoff having a kink that forms a lighting function of the low-beam type with the first beam.

11. The lighting device as claimed in claim 1, wherein the first collector includes multiple reflective surfaces which are disposed next to one another and each of which is associated with one of the multiple first light sources, the multiple reflective surfaces having rear edges, along a main direction of propagation of the light, which are adjacent to a straight line on the plate, the first optical device exhibiting a focal line which coincides with the straight line or is located between the straight line and the multiple first light sources, or else is located behind the straight line at a distance less than or equal to 10 mm.

12. The lighting device as claimed in claim 1, wherein the first optical device is a mirror having a constant parabolic profile along a horizontal direction, when the lighting device is in the mounting position, so as to exhibit a rectilinear focal line.

13. The lighting device as claimed in claim 1, wherein each of the first and second light-emitting engines is disposed at an edge of the plate, each of the first and second collectors projecting beyond the edge, the edge having a stepped profile with a step corresponding to each of the first and second light-emitting engines.

14. The lighting device as claimed in claim 1, wherein each of the first and second optical devices is configured to vertically deflect, by reflection and/or refraction, the first and second light beams respectively from a direction corresponding to the inclination of the plate to a direction parallel to the optical axis.

15. A lighting device for a motor vehicle, comprising:

a first lighting module including a first light-emitting engine including one or more first light sources and a first collector with at least one reflective surface able to reflect light rays emitted by the one or more first light sources in a first light beam with a cutoff, and a first optical device able to project the first light beam along an optical axis of the lighting device;

a second lighting module including a second light-emitting engine including one or more second light sources, a second collector with at least one reflective surface able to reflect light rays emitted by the one or more second light sources in a second light beam, and a second optical device able to project the second light beam along the optical axis of the lighting device; and a plate having an inclination γ in relation to a horizontal plane, about an axis of inclination which is horizontal and perpendicular to the optical axis; the first and second light-emitting engines being disposed on the plate, with an offset along a vertical projection of the optical axis onto the plate, and the first and second optical devices have an offset along a vertical direction, when the lighting device is in the mounting position; and wherein the first collector includes multiple reflective surfaces which are disposed next to one another and each of which is associated with one of the multiple first light sources, the multiple reflective surfaces having rear edges, along a main direction of propagation of the light, which are adjacent to a straight line on the plate, the first optical device exhibiting a focal line which coincides with the straight line or is located between the straight line and the multiple first light sources, or else is located behind the straight line at a distance less than or equal to 10 mm.

16. The lighting device as claimed in claim 15, wherein the first optical device is a mirror having a constant parabolic profile along a horizontal direction, when the lighting device is in the mounting position, so as to exhibit a rectilinear focal line.

17. The lighting device as claimed in claim 15, further comprising a third lighting module including a third light-emitting engine including one or more third light sources, a third collector with at least one reflective surface able to reflect light rays emitted by the one or more third light sources in a third light beam, and a third optical device able to project the third light beam along the optical axis of the lighting device; the third light-emitting engine being disposed on the plate with an offset along the vertical projection of the optical axis so as to form, on the plate, with the first and second lighting modules, a profile with an overall inclination β in relation to the axis of inclination.

18. A lighting device for a motor vehicle, comprising:

a first lighting module including a first light-emitting engine including one or more first light sources and a first collector with at least one reflective surface able to reflect light rays emitted by the one or more first light sources in a first light beam with a cutoff, and a first optical device able to project the first light beam along an optical axis of the lighting device;

a second lighting module including a second light-emitting engine including one or more second light sources, a second collector with at least one reflective surface able to reflect light rays emitted by the one or more second light sources in a second light beam, and a second optical device able to project the second light beam along the optical axis of the lighting device; and a plate having an inclination γ in relation to a horizontal plane, about an axis of inclination which is horizontal and perpendicular to the optical axis; the first and second light-emitting engines being disposed on the plate, with an offset along a vertical projection of the optical axis onto the plate, and the first and second optical devices have an offset along a vertical direction, when the lighting device is in the mounting position, with each of the first and second light-emitting engines being disposed at an edge of the plate, each of the first and second collectors projecting beyond the edge, and the edge having a stepped profile with a step corresponding to each of the first and second light-emitting engines.

19. The lighting device as claimed in claim 18, further comprising a third lighting module including a third light-emitting engine including one or more third light sources, a third collector with at least one reflective surface able to reflect light rays emitted by the one or more third light sources in a third light beam, and a third optical device able to project the third light beam along the optical axis of the lighting device; the third light-emitting engine being disposed on the plate with an offset along the vertical projection of the optical axis so as to form, on the plate, with the first and second lighting modules, a profile with an overall inclination β in relation to the axis of inclination.

20. The lighting device as claimed in claim 18, wherein the first optical device is a mirror having a constant parabolic profile along a horizontal direction, when the lighting device is in the mounting position, so as to exhibit a rectilinear focal line.

* * * * *